Patented June 17, 1947

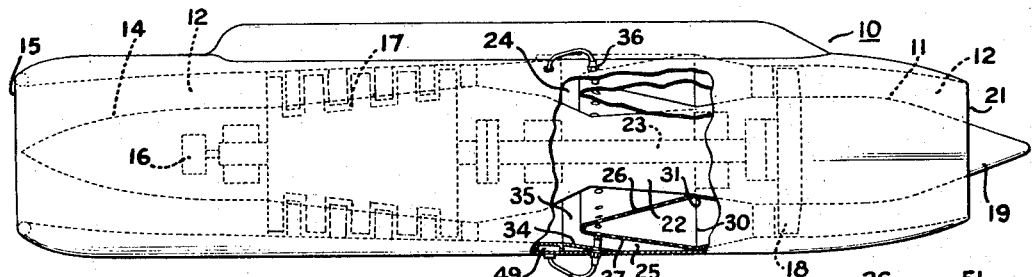
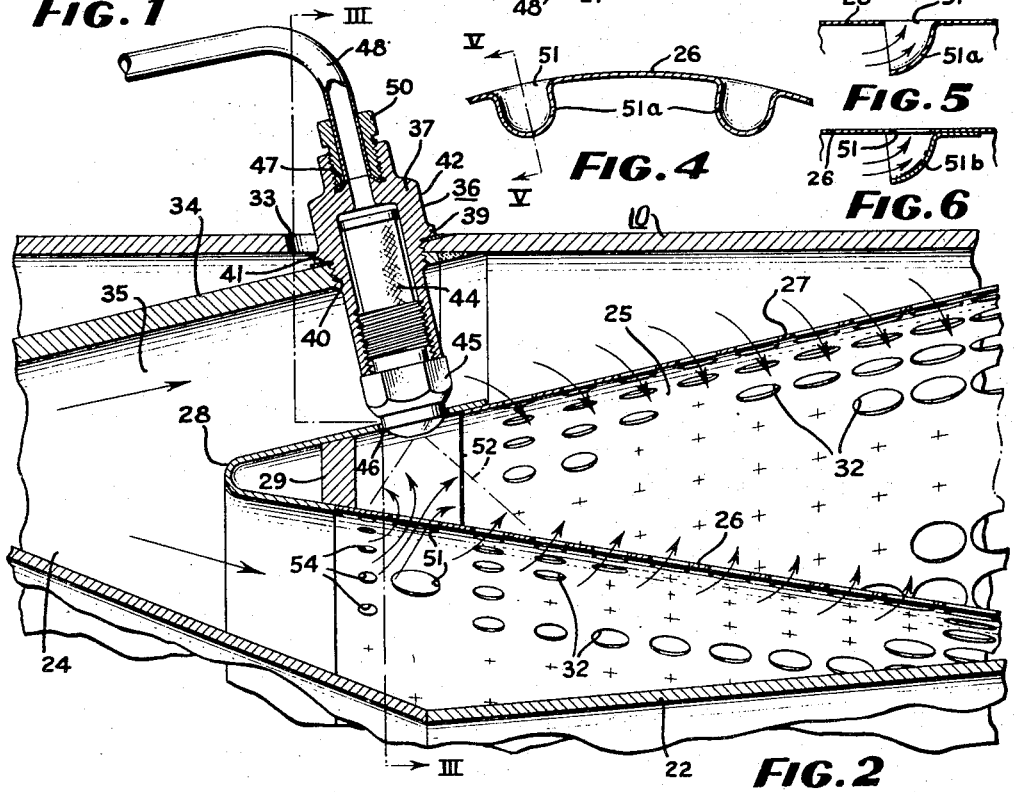
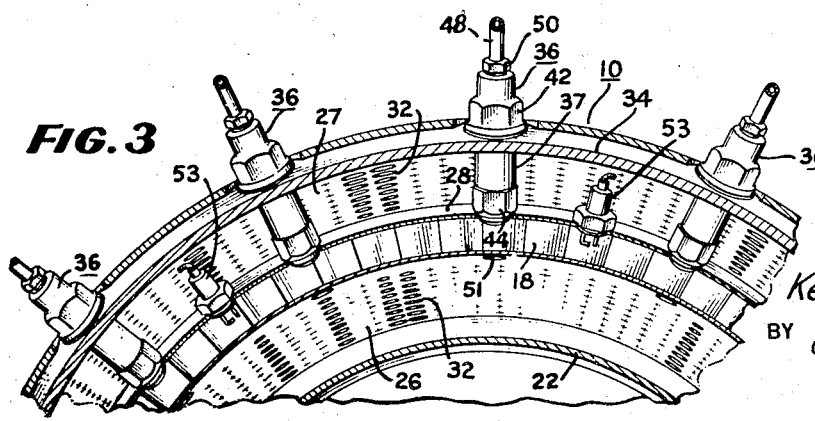

2,422,213

UNITED STATES PATENT OFFICE 2,422,213

COMBUSTION CHAMBER

Keith V. Smith, Wilkinsburg, Pa., assignor to Westinghouse Electric Corporation, East Pittsburgh, Pa., a corporation of Pennsylvania Application June 9, 1944, Serial No. 539,498

3 Claims. (Cl. 263—19)

This invention relates to power plants and particularly to the manner of mounting fuel nozzles in a gas turbine power plant and it has for an object to provide an improved device of the character set forth.

The present invention, while not limited thereto, is particularly adapted to be used in a gas turbine power plant like that disclosed in the patent to Stewart Way, No. 2,405,723 issued August 13, 1946, and assigned to the assignee of the present invention. A power plant of the type disclosed in the mentioned Way patent includes an air compressor, air heating apparatus, a gas turbine, and a propulsion jet nozzle all housed within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air is then heated in the heating apparatus by combustion of fuel supported by the compressed air. The resulting motive fluid, comprising the products of combustion and excess compressed air, drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a pump which is preferably driven by the turbine.

In a plant of this character, fuel, such as gasoline, is atomized by means of fuel nozzles in a combustion chamber or chambers where it readily mixes with the compressed air supplied to the chamber and is ignited by suitable means such as spark plugs mounted in the combustion chamber.

The present invention is particularly concerned with the location of and manner of mounting the fuel nozzles. In accordance with the present invention the nozzles are readily removable for inspection, cleaning and replacement and are arranged so that the fuel issuing from the nozzles is immediately and throughly mixed with fresh compressed air entering the combustion chamber so that continuous and even burning of the air-fuel mixture is obtained.

It is, accordingly, a further object of the invention to provide an improved fuel nozzle and manner of mounting the same in a combustion apparatus to permit ready removal and replacement of the nozzle.

It is another object of the invention to provide an improved air heating apparatus in which rapid and thorough intermixing of air and fuel are obtained.

These and other objects are effected by the invention as will be apparent from the following description and claims taken in connection with the accompanying drawings, forming a part of this application, in which:

Fig. 1 is a side elevational view of a gas turbine power plant in which the present invention is incorporated, portions of the outer casing structure being broken away to show certain details of construction;

Fig. 2 is a fragmentary sectional view shown on an enlarged scale of the combustion apparatus of the plant shown in Fig. 1;

Fig. 3 is a transverse sectional view taken substantially on the line III—III of Fig. 2;

Fig. 4 is a sectional view through the portion of the inner wall of the combustion chamber substantially opposite the fuel atomizing nozzles;

Fig. 5 is a sectional view taken substantially on the line V—V of Fig. 4; and

Fig. 6 is a view similar to Fig. 5 illustrating a modification.

The power plant shown in Fig. 1 comprises in general an outer casing structure 10 open from end to end and a central core structure 11 providing an axial flow passage 12 which extends fore and aft with respect to the aircraft in which it is mounted.

The central core structure 11 is supported by the casing structure along its longitudinal axis and includes a hollow fairing cone 14 defining with the forward or left end, as viewed in Fig. 1, of the casing 10 an air inlet 15 of the flow passage 12. The fairing cone 14 houses a fuel pump, generally indicated 16, and other auxiliary apparatus (not shown) driven by the turbine. The core structure also includes an axial flow compressor 17, a gas turbine 18 and an axially movable tailpiece 19 which defines with the rear end of the casing structure 10, an adjustable propulsion nozzle 21. The intermediate portion of the core structure 11 between the compressor 17 and the turbine 18 comprises an inner wall structure 22 which houses a shaft 23 connecting the rotor of turbine 18 and the rotor of the compressor 17. This inner wall structure 22 defines with the outer casing structure 10, an annular space 24 which connects the compressor blade passage with the turbine blade passage and houses the air heating or combustion apparatus.

The annular space 24 is provided with a suitable combustion chamber 25, such as shown in the copending application of Fay et al., Serial No. 511,468, filed on November 23, 1943, and assigned to the assignee of the present invention, for heating the air compressed by the compressor.

In the embodiment illustrated, the combustion chamber 25 comprises an inner cone 26 and an outer cone 27 tapering in opposite directions and secured together at their upstream ends by an annular ring 28 of V section which serves to divide the stream of air discharging from the compressor. The ring 28 is provided with a bracing ring 29 which closes off the forward end of the chamber 25. The downstream ends 30 and 31 of the cones 26 and 27, respectively, are secured to the inner wall structure 22 and outer casing 10, respectively, for supporting the combustion chamber in the casing. The walls of the inner and outer cones are perforated, having circumferentially spaced, axially extending rows of holes 32. The holes are preferably of progressively increasing size in the downstream direction and serve to admit the compressed air into the combustion chamber.

In the mentioned copending application of Way et al., Serial No. 511,468, filed on November 23, 1943, a plurality of fuel atomizing nozzles are mounted in the closed end of the combustion chamber and direct the fuel axially of the combustion chamber. Suitable ignition means, such as spark plugs mounted downstream of the nozzles ignite the air-fuel mixture. It is a feature of the present invention to mount the fuel atomizing nozzles, so that they may be readily removed for cleaning or inspection, in a very simple, inexpensive manner and to locate large air admission openings in the combustion chamber walls so that immediate and thorough mixing of the air and fuel is obtained. The ignition means are also located so that the possibility of stray air currents extinguishing the spark before it ignites the air-fuel mixture is substantially prevented.

The outer casing 10 is provided with a row of large openings 33, corresponding in number to the number of fuel nozzles, and providing access to an inner conical casing structure 34 which defines with the inner wall structure 22 a diffuser 35 leading from the compressor 17 to the combustion chamber 25. In line with each of the openings 33 the casing 34 is provided with a threaded opening 40, each of which receives a removable fuel atomizing nozzle, generally indicated 36. Any desired number of nozzles may be provided. The nozzles 36 each comprise a sleeve 37 removably threaded into an opening 40 and having a shoulder portion 39 adapted to clamp a gasket 41 to the bulkhead 34 to provide a fluidtight seal at the opening 40. Immediately above the shoulder 39 the sleeve 36 is preferably provided with a polygonal portion 42 to receive a wrench for tightening and removing the fuel nozzle.

The inner end of the sleeve 37 is internally threaded and removably receives a strainer 44 and a nozzle head 45 which projects into an opening 46 provided in the outer cone 27 of the combustion chamber. The outer end of the sleeve is recessed and internally threaded, the bottom of the recess being shaped to provide an inverted flare seat 47. Fuel is supplied to the nozzle 36 by means of a pipe 48 extending from a manifold 49 and clamped to the inverted flare seat 47 by means of a nut 50, the end of which corresponds in shape to the seat 47 for effecting a fluidtight joint. It will be understood that the manifold 49 is in turn connected to a suitable supply of fuel supplied under pressure to the nozzles by means of a pump 16.

The inner cone 26 of the combustion chamber is provided with a large opening 51 directly opposite each nozzle 36 so that a large amount of air at high velocity enters the combustion chamber directly into the spray cone 52 of the nozzle causing considerable turbulence and effecting an immediate mixing of the air and fuel. The stream of air flowing through the hole 51 also functions to prevent any fuel bubbles, which might stop the flow of oil, from forming on the nozzle tip as might occur when the fuel is under low pressure.

If desired, small scoops 51a opening in a downstream direction and formed about the openings 51 as shown in Figs. 4, 5 and 6 may be provided so that the momentum of the air flowing from the compressor is effective to increase the velocity of the air flowing through the openings 51. Fig. 4 represents a transverse section through the inner cone 26 of the combustion chamber taken through the approximate centers of the openings 51, the scoops 51a in this figure being pressed out of the wall 26 in forming the openings 51. Alternatively, the scoops may be formed as separate members 51b secured, as by spot welding, to the outer surface of the inner cone 26 around the opening 51 as shown in Fig. 6.

Ignition of the fuel and air mixture is obtained by means of spark plugs 53, or other suitable ignition means, which are preferably mounted in the plane of and between the fuel nozzles 36 as shown in Fig. 3.

To insure a continuous flow of the fuel and air mixture through the combustion chamber and to prevent stagnation of the mixture in the upstream end of the combustion chamber, a row of small openings 54 may be provided upstream of the large openings 51.

From the structure described above, it will be seen that the fuel nozzles 36 are easy to remove and replace and that the relation of the large air openings 51 directly opposite each nozzle provides thorough mixing of the air and fuel and also prevents formation of fuel bubbles at the nozzle tip which might tend to restrict the flow or atomization of the fuel.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a gas turbine power plant wherein an outer casing supports an inner casing and has secured thereto and inwardly thereof an intermediate conical casing, said inner casing having a portion coaxial with the conical casing and which is oppositely coned with respect to the latter and cooperates therewith to provide a diffuser for air received at high velocity; means including oppositely-coned inner and outer foraminous wall elements connected by an apical junction portion extending reentrantly into the diffuser and defining a combustion chamber which is coaxial with the diffuser and which diverges away from the latter; means for supplying atomized fuel to the apical portion of the combustion chamber including a plurality of atomizers each of which extends through aligned openings formed in the outer casing, the intermediate conical casing, and the outer conical wall element so as to be accessible externally of the outer casing and to discharge atomized fuel into the combustion chamber; and means for detachably connecting and disconnecting each atomizer to the intermediate conical casing; the outer casing openings for the atomizers being larger than the latter to provide for connection and disconnection thereof by effort applied externally of the outer casing.

2. The combination as claimed in claim 1 wherein the means providing for connection and disconnection of each atomizer with respect to the intermediate conical casing is comprised by cooperating inner conical casing and atomizer threads, an abutment formed on the atomizer for engagement with the outer surface of the inner conical casing, and a portion for engagement by a wrench applied externally of the outer casing.

3. Combustion apparatus comprising a tubular outer casing; a core structure surrounded by and spaced radially from said outer casing, said core structure and outer casing defining a circumferentially-continuous passage for flow of air; inner and outer tubular wall structures in said air flow passage in side-by-side relation, said wall structures being radially spaced throughout a major portion of their length from each other and from the core structure and the outer casing with the space between said tubular wall structures providing a circumferentially-continuous combustion chamber blanketed inwardly and outwardly by circumferentially-continuous air flow passages, said outer tubular casing and said outer tubular wall structure having an aligned pair of openings therein; and a fuel nozzle positioned in said pair of openings for admitting fuel to said combustion chamber, said nozzle being insertable and removable from exteriorly of said outer casing, said inner tubular wall structure being provided with one or more apertures so disposed as to admit air from the inner air flow passage to the combustion chamber directly into the fuel admitted by the nozzle.

KEITH V. SMITH.

REFERENCES CITED

The following references are of record in the file of this patent:

UNITED STATES PATENTS

| Number | Name | Date |
|---|---|---|
| 1,205,389 | Preston | Nov. 21, 1916 |
| 1,854,615 | Lasley | Apr. 19, 1932 |
| 2,085,761 | Lysholm | July 6, 1937 |
| 2,243,467 | Jendrassik | May 27, 1941 |

FOREIGN PATENTS

| Number | Country | Date |
|---|---|---|
| 416,030 | Great Britain | Sept. 3, 1934 |
| Add. 13,715 | France | Apr. 3, 1911 |
| 807,715 | France | Oct. 19, 1936 |
| 393,512 | Germany | Apr. 11, 1924 |
| 210,655 | Switzerland | Oct. 16, 1940 |
| 219,485 | Switzerland | May 16, 1942 |